No. 707,961. Patented Aug. 26, 1902.
S. ELLIOTT.
SORTING AND ADDRESSING MACHINE.
(Application filed Jan. 19, 1900. Renewed May 11, 1901.)
(No Model.)
9 Sheets—Sheet 1.

WITNESSES:
J. G. Hinkel
H. W. Gillman, Jr.

INVENTOR
Sterling Elliott
BY
Foster Freeman
ATTORNEYS.

No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 2.

WITNESSES:

INVENTOR
Sterling Elliott
BY
ATTORNEYS

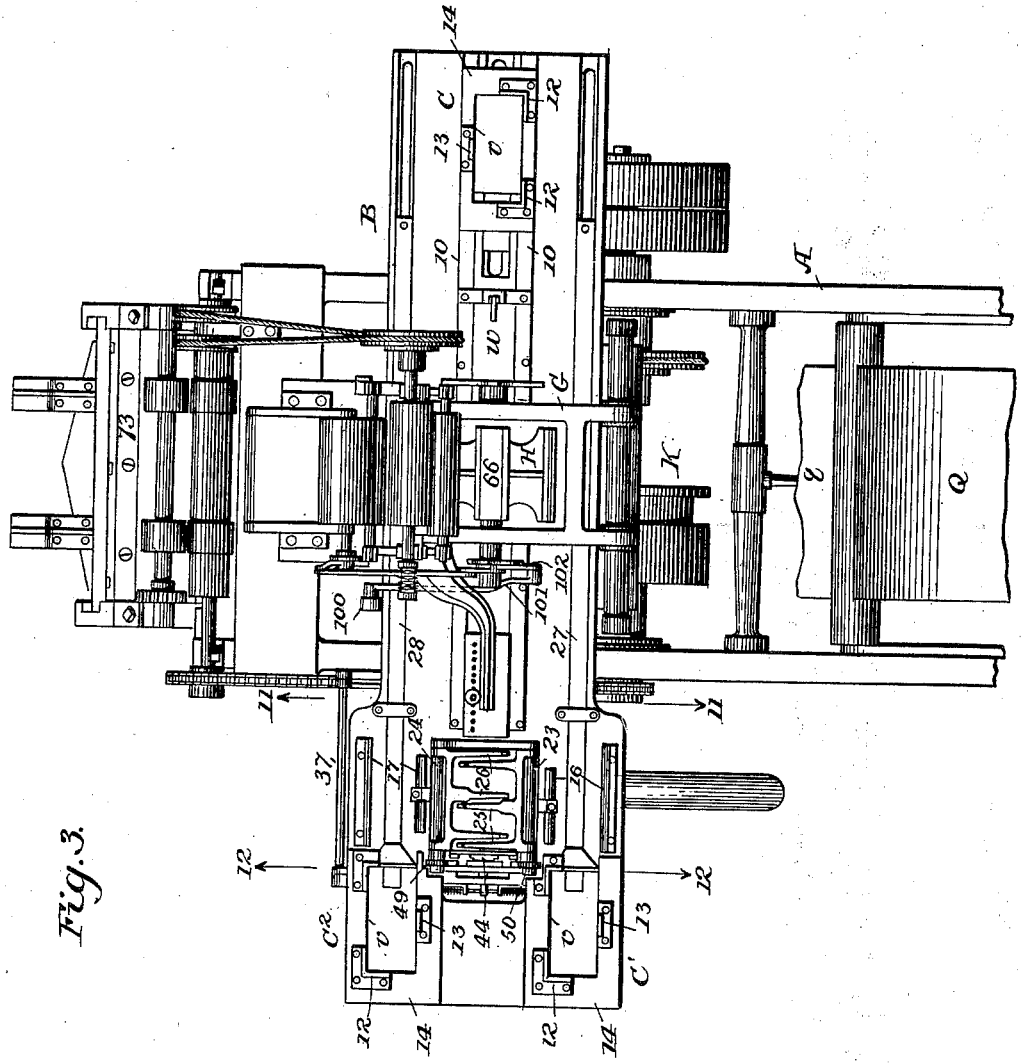

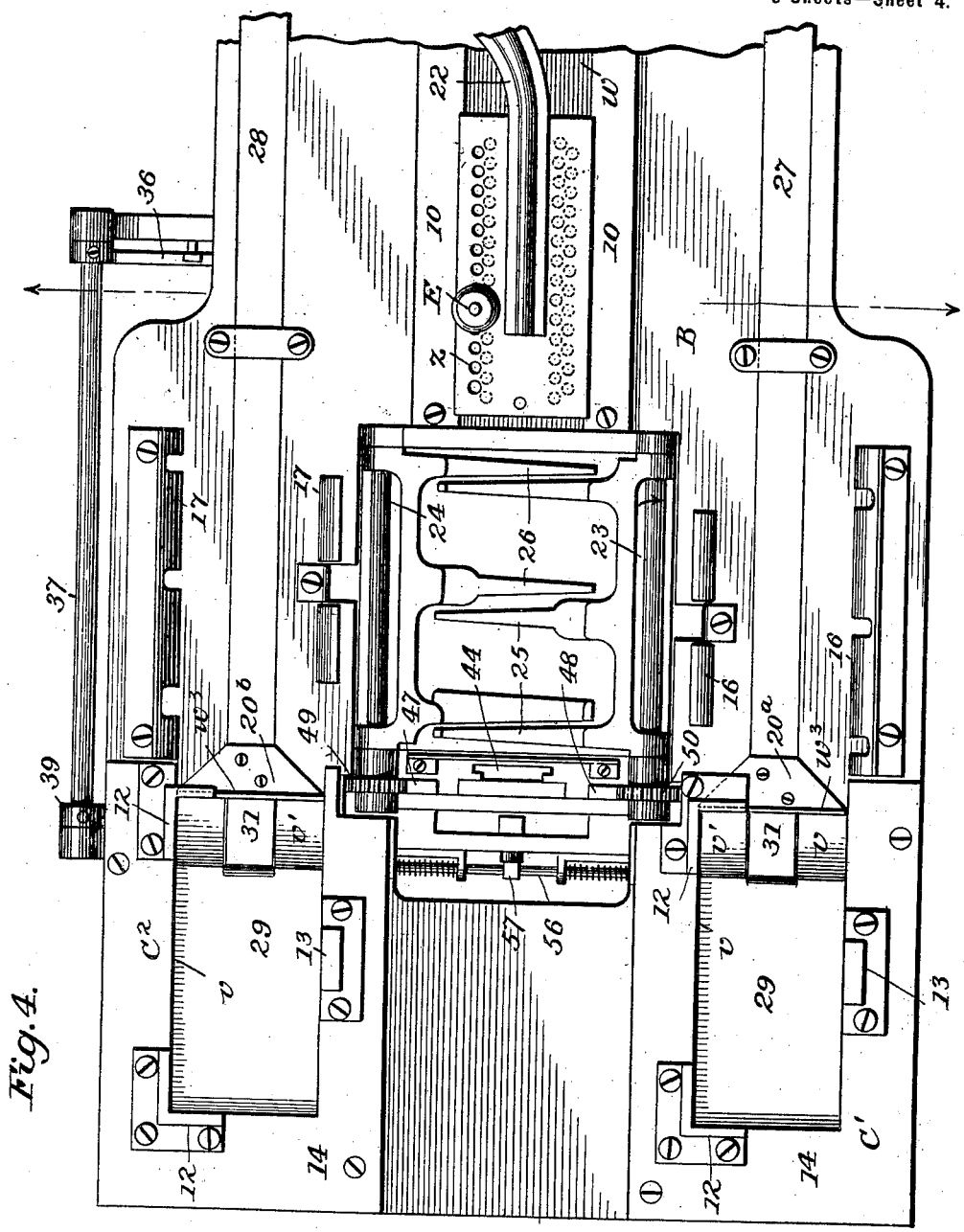

No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 5.
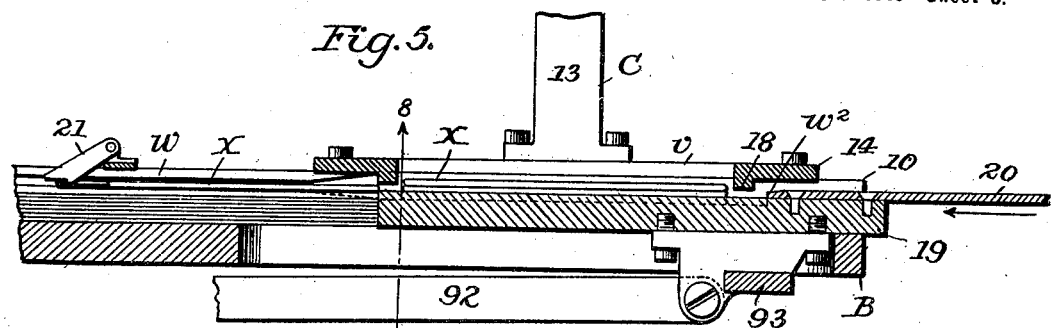
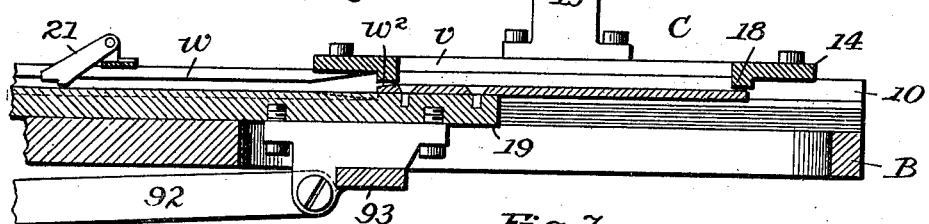
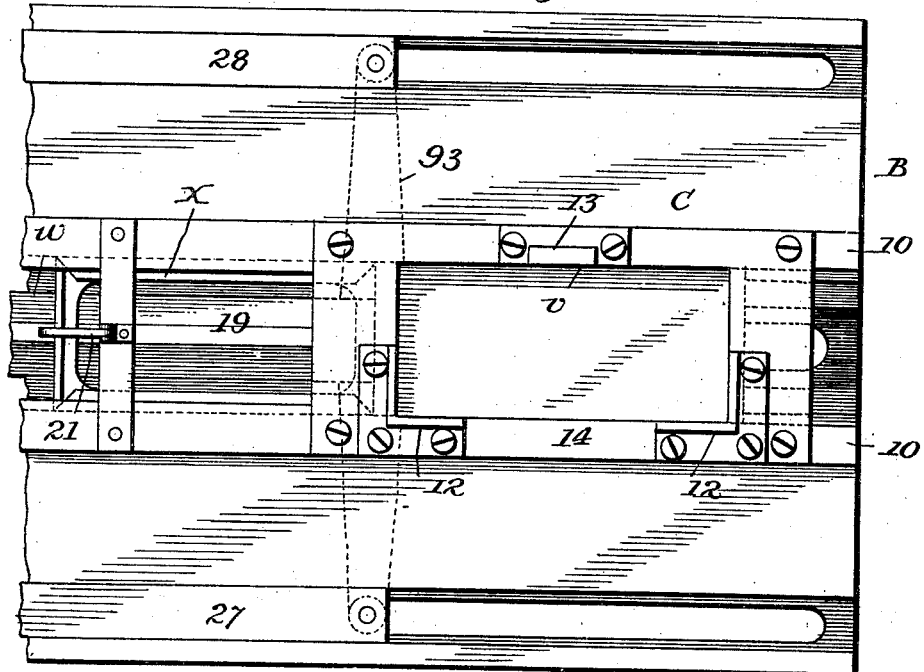

No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 6.

WITNESSES:
INVENTOR
Sterling Elliott
BY
ATTORNEYS

No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 7.
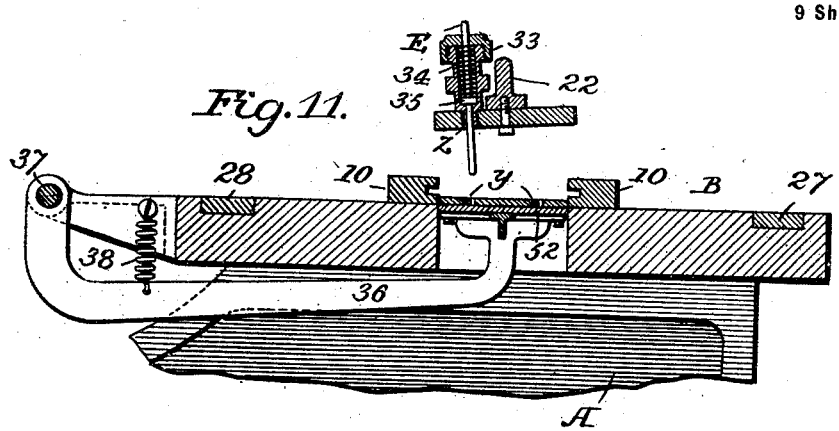
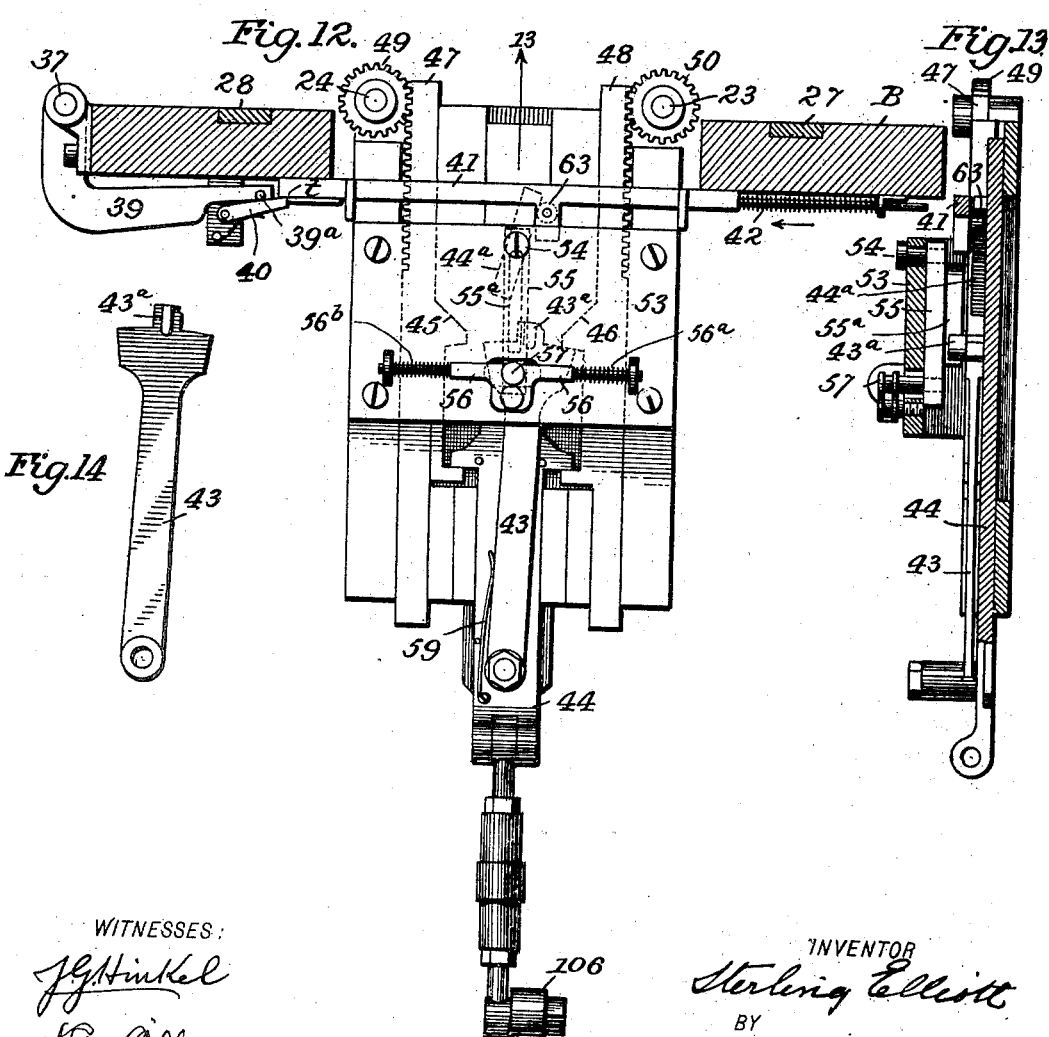
WITNESSES:
INVENTOR
Sterling Elliott
BY
ATTORNEYS No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 8.
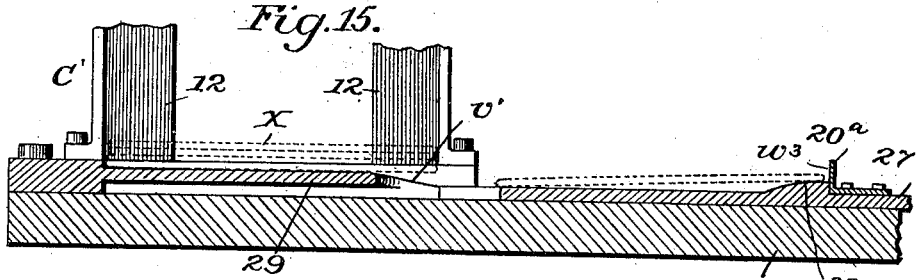
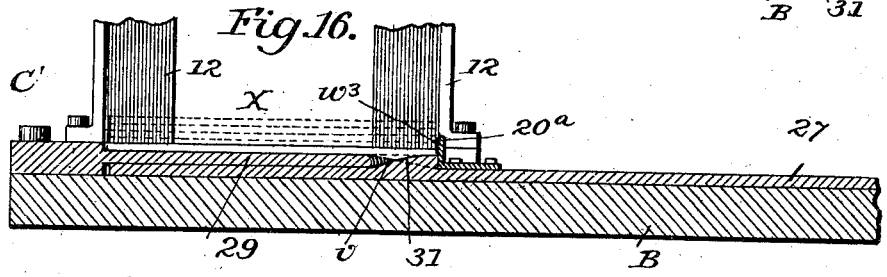
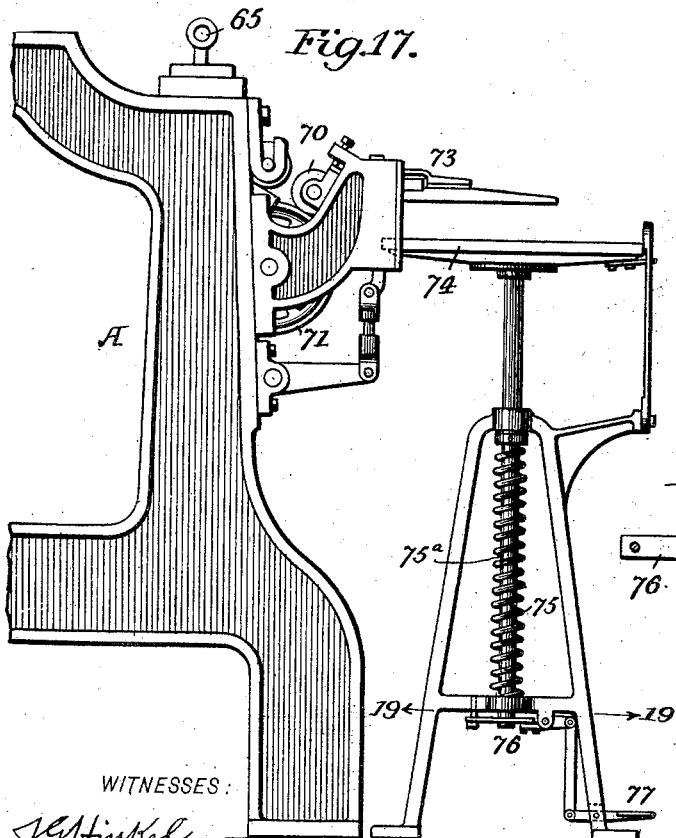
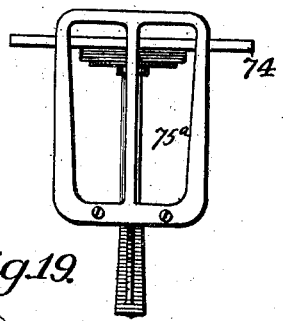
WITNESSES:
INVENTOR
Sterling Elliott
BY
ATTORNEYS No. 707,961. Patented Aug. 26, 1902.
S. ELLIOTT.
SORTING AND ADDRESSING MACHINE.
(Application filed Jan. 19, 1900. Renewed May 11, 1901.)
(No Model.) 9 Sheets—Sheet 9.
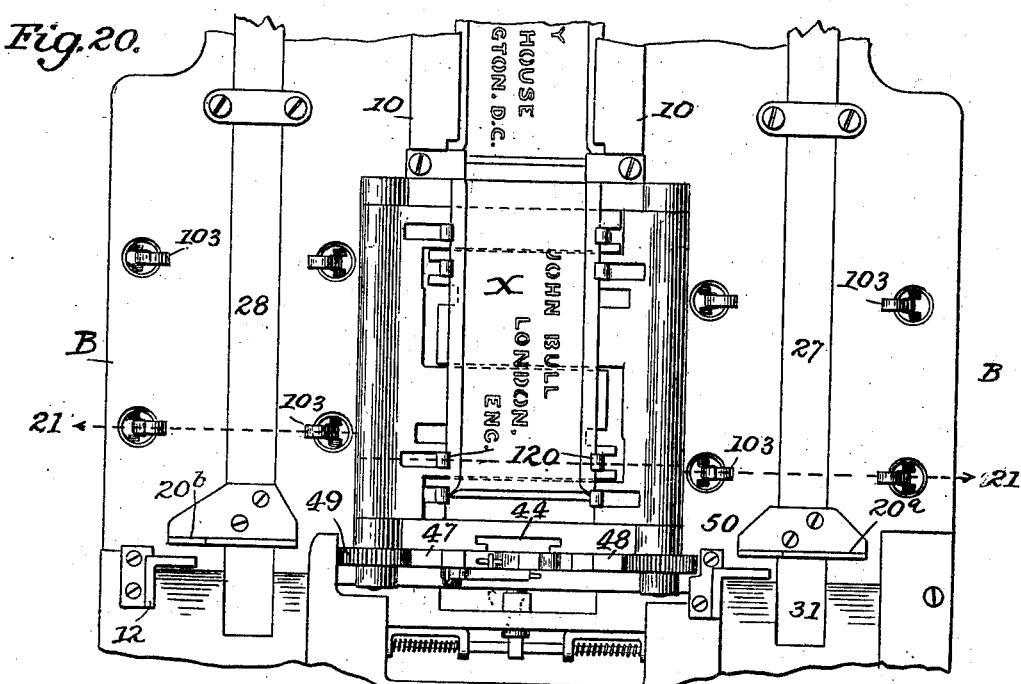
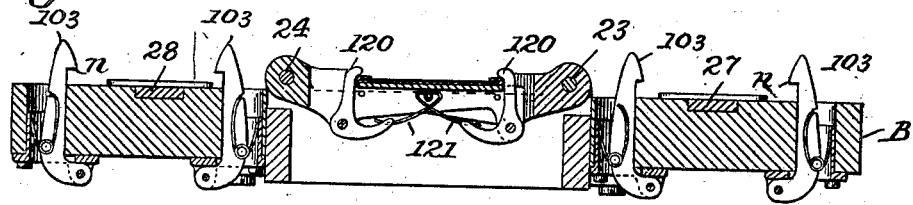
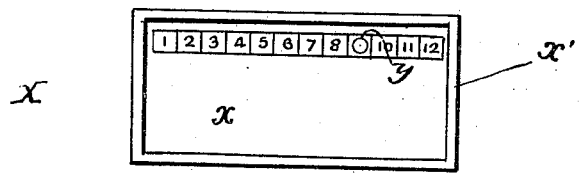
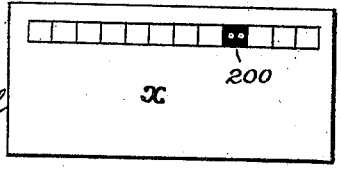
WITNESSES:
INVENTOR.
Sterling Elliott
ATTORNEYS

UNITED STATES PATENT OFFICE.

STERLING ELLIOTT, OF BOSTON, MASSACHUSETTS, ASSIGNOR TO THE ELLIOTT COMPANY, OF BOSTON, MASSACHUSETTS, A CORPORATION OF MAINE.

SORTING AND ADDRESSING MACHINE.

SPECIFICATION forming part of Letters Patent No. 707,961, dated August 26, 1902.

Application filed January 19, 1900. Renewed May 11, 1901. Serial No. 59,829. (No model.)

*To all whom it may concern:*

Be it known that I, STERLING ELLIOTT, a citizen of the United States, residing at Boston, in the county of Suffolk and State of Massachusetts, have invented certain new and useful Improvements in Sorting and Addressing Machines, of which the following is a specification.

My invention is a machine for sorting plates, stencils, cards, &c., and when desired for printing therefrom; and it consists of certain means adapted to coöperate with plates having contact-bearings variously arranged to determine the distribution of the plates, as fully set forth hereinafter and as illustrated in the accompanying drawings, in which—

Figure 1:
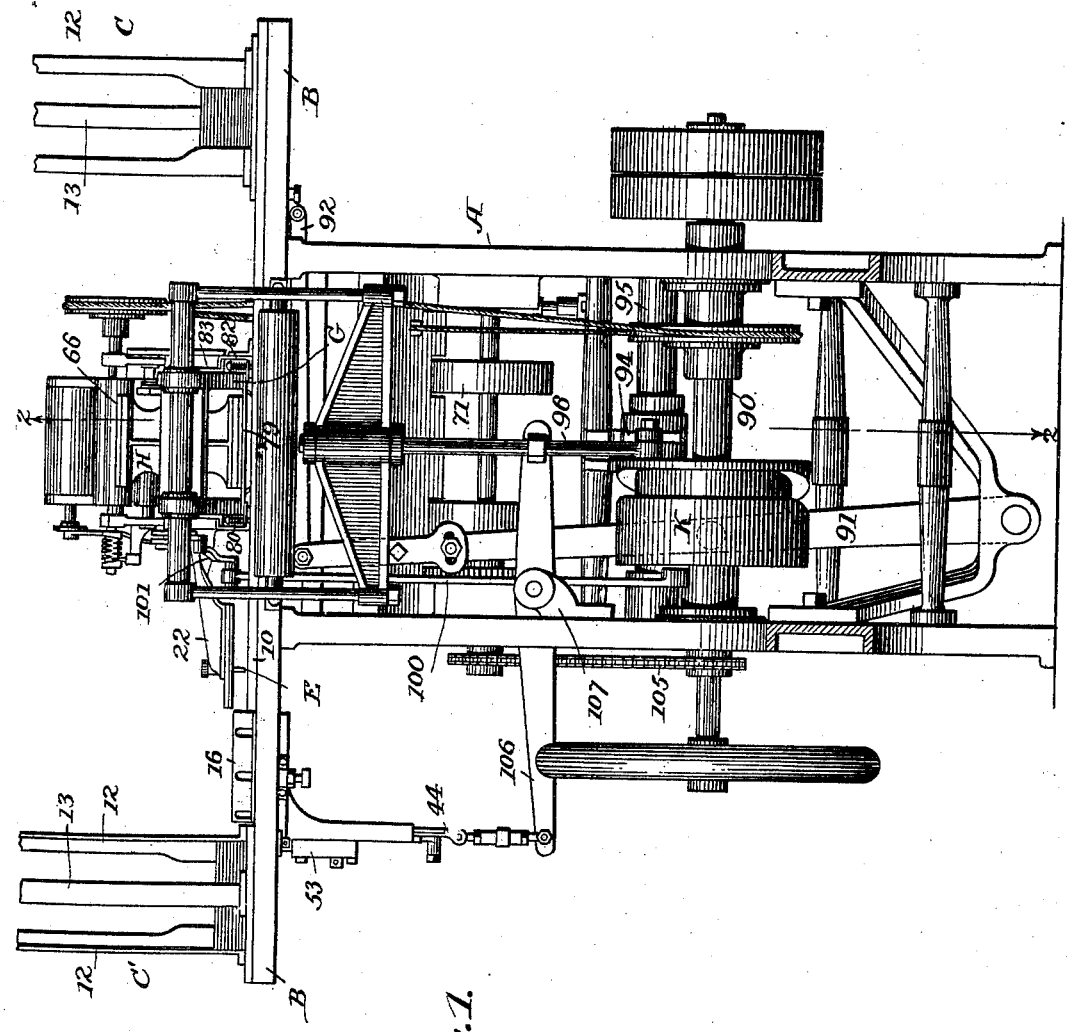
Figure 2:
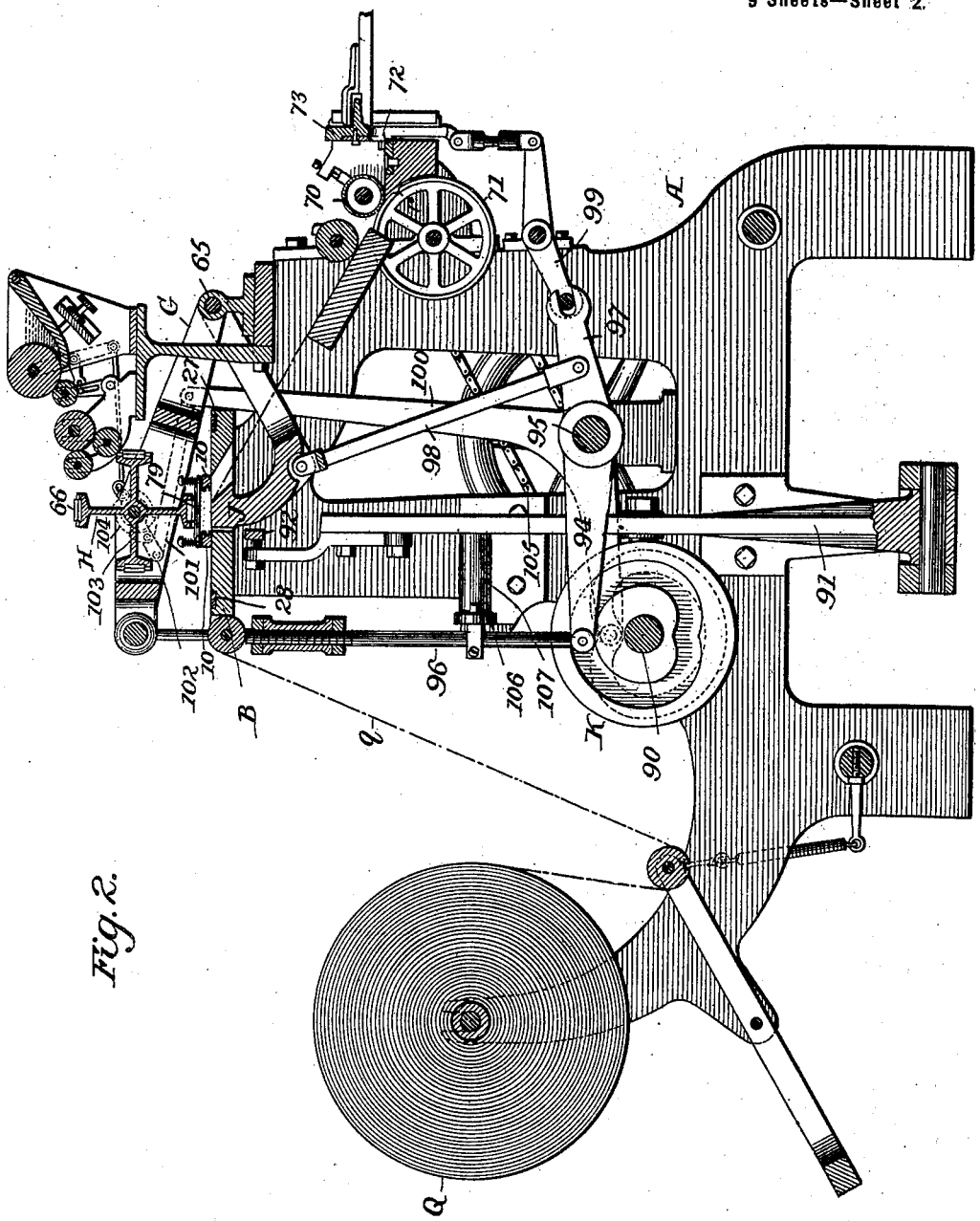
Figure 9:
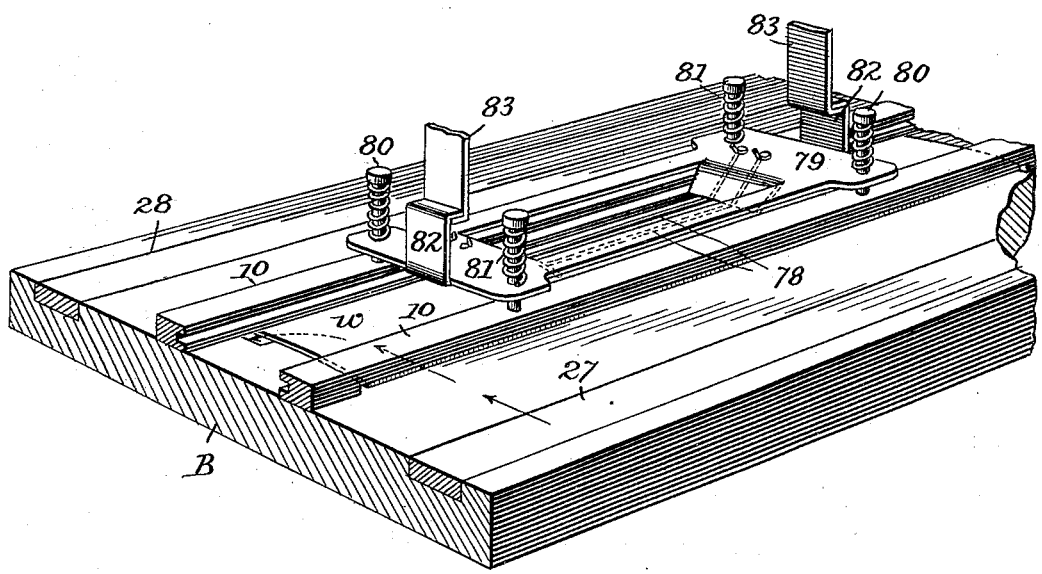
Figure 10:
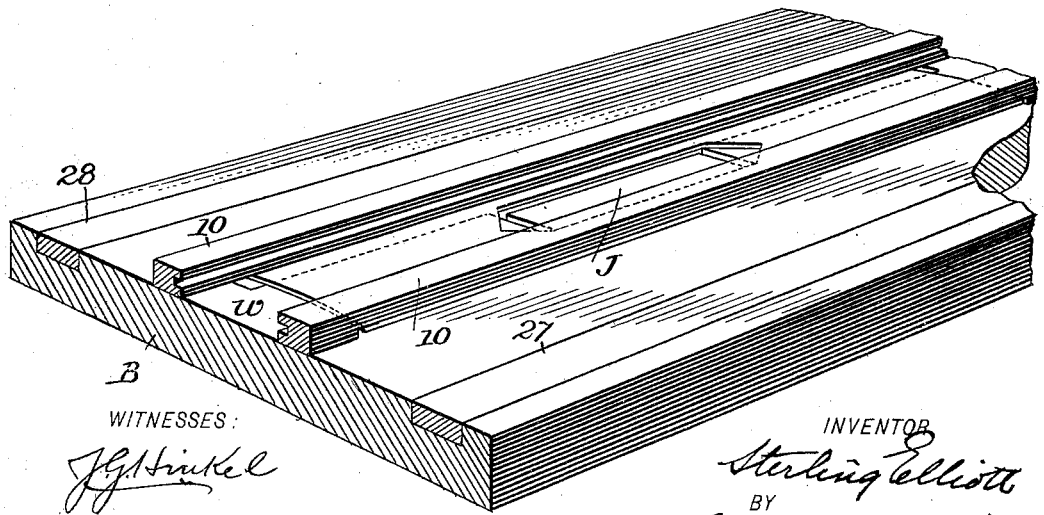

Figure 1 is a front elevation of a sorting and printing machine embodying my improvements. Fig. 2 is a transverse section on the line 2 2, Fig. 1. Fig. 3 is a plan view; Fig. 4, an enlarged plan of the sorting or shifting end of the machine. Figs. 5 and 6 are sectional views through the lower part of the table and distributing-receptacle, showing the pusher in different positions. Fig. 7 is a plan of Fig. 5 in part section. Fig. 8 is a transverse section on the line 8 8, Fig. 5. Fig. 9 is a perspective sectional view showing parts connected with the table and distributing-receptacle. Fig. 10 is a perspective sectional view of the part of the table below the printing-head. Fig. 11 is a transverse section, enlarged, on the line 11 11, Fig. 3. Fig. 12 is a transverse section, enlarged, on the line 12 12, Fig. 3; Fig. 13, a vertical section on the line 13, Fig. 12; Fig. 14, a face view of the sorting-pawl detached; Figs. 15 and 16, enlarged sectional views through the lower parts of the receiving-receptacles and table; Fig. 17, a side view showing the rear part of the apparatus; Fig. 18, an elevation of part of the delivery-table; Fig. 19, a section on the line 19 19, Fig. 17; Fig. 20, an enlarged plan of the distributing devices, showing an addition not in other figures. Fig. 21 is a section on the line 21 21, Fig. 20; Fig. 22, a plan showing one form of printing-plate and regulating-bearings; Fig. 23, a plan showing another form of printing-plate and regulating-bearings.

In many establishments, as in newspaper-offices, publication-houses issuing serials, and in the conduct of the business of certain societies, it is necessary to send matter, generally mail-matter, at stated intervals for different periods of time to different persons or to different addresses. It is therefore necessary to maintain constant supervision and inspection to avoid forwarding matter after any determined period, as the period of subscription, and this involves care, time, and expense and is apt to result in mistakes. To avoid these and other difficulties and insure the proper addressing of the matter to be forwarded until the expiration of any determined period and to then arrest it and to effect this automatically, I make use of addressing blocks, sheets, or tablets, each provided with what I term "regulator-bearings" arranged to coact with automatic selecting mechanism which, generally combined with printing devices, retains in operative conditions the sheets which are to be reused, but which serves to act on the selecting mechanism so as to cause the discharge of such addressing-sheets as have been operated with for a predetermined time. Fig. 22 illustrates one form of such printing card or tablet, which may be made in various ways, but which I hereinafter term a "stencil," as the address is cut in a sheet $x$, which is inclosed by a frame $x'$. This stencil has at any suitable point a bearing so arranged as by its contact with a movable sorter-bearing of a sorting-machine to actuate the sorting devices, which determine the disposition of the stencils. Thus the sheet $x$ in the construction shown has a bearing-point (in case of monthly serials) for each month of the year, and the sorter of the sorting-machine by its contact with successive bearing-points on successive passages of the stencil through the machine will cause the stencil to be restored to position among the active stencils—that is, those to be reused; but when the sorter is so adjusted that it will fail to make such contact, as when the stencil on its ninth use presents a hole $y$ opposite the sorter, the latter is differently actuated and causes such operation of the parts of the sorting-machine that this stencil (and all having openings similarly arranged) will be discharged as of no further use. It will be evident that the contact-point may be the point of discharge—that is, that there may be eight holes $y$ in the positions 1 to 8, allowing the passage of the sorter, as it is on successive months set in the eight different positions, but making contact therewith when it is set in the ninth position, it merely being necessary that the stencil have such a bearing or bearings that it will coact in conjunction with the sorter to retain the stencil in active use during a certain number of operations and will put it out of action on the completion of the desired number.

As the particular construction of stencil is not essential and as the stencil is not here claimed, I will not further describe the same, but will now describe one form of apparatus adapted for sorting stencils in the manner above set forth.

A frame A supports a table B, upon which latter are the main operating parts. At one end of the table B, above a channel $w$ between guides 10 10, is a vertical distributing holder or rack C for a pile of stencils to be printed upon, and at the opposite end of the table are similar receiving-racks $C'$ $C^2$, each rack consisting, as shown, of two vertical angle-bars 12 12 and a flat bar 13, the said bars erected upon a plate 14, having an opening $v$, corresponding in size to the exterior dimensions of the stencil X to permit the latter to pass downward into the channel $w$. The mass of stencils is placed in the distributing-rack C. The lower stencil descends into the channel $w$ and is pushed from the rack between the guides 10 10 to a central position of the table B, where the printing is effected, is then again pushed over sorting devices, which cause the stencil to be carried onward either between the guides 16 16 to a position below the rack $C'$ for active stencils or backward between guides 17 17 below the rack $C^2$ for discarded stencils, according as the stencil is to be reused or discarded. The plate 14 of the rack C rests directly on the guides 10 10, Figs. 5 to 8, and there is at the under side around the opening $v$ a rib 18, which at the end of the plate 14 nearest the printing devices is cut away, so that the central portion $w'$, Fig. 8, is lowest, and the pusher-bar 19 of the pusher 20 is inclined at the opposite sides, so that the center is the highest. By this means the stationary bearing-point $w'$ will make contact with the end of the stencil-frame which is next above the lowest stencil-frame and will prevent the former from pushing forward with the lowest as it is pushed by the end or shoulder $w^2$ of the pusher 20 even if the frame is bent, while owing to the shape of the bar 19 and position of the bearing $w'$ the lowest stencil will contact with the shoulder $w^2$ of the pusher 20 even if the other parts of the stencil are bent out of position. By this means I absolutely insure the pushing out of the lowest stencil and the retention of that next above it, even if the stencil frames or plates should be bent. After one stencil has been pushed forward a pivoted dog 21 catches the inner edge of the frame, prevents its sliding back, and holds the stencil in position to make contact with that which is next pushed out, so that the stencils push each other until that first pushed out is in a central position beneath the printing devices of any suitable character where the impression is taken. At the next movement this stencil is pushed away from the printing devices and after two more movements is brought in position over the sorting device, an arm 22 extending over the channel $w$, which arm serves in part to hold the stencils in place as they approach the sorting device. The sorting device may be of any desired construction, but, as shown, is provided with two parallel rock-shafts 23 and 24, Figs. 3 and 4, having arms 25 26, projecting from opposite sides and normally lying underneath the path of the stencils approaching between the guides 10 10, so that the stencils in succession are brought above each set of arms. If the shaft 23 is rocked in the direction of its arrow, or outward, Fig. 4, the stencil will be thrown over between the guides 16 16. If the shaft 24 is rocked outward, the stencil will be carried over by the arm 26 and be laid between the guides 17 17. If a stencil is placed between either pair of guides, it is pushed onward by a pusher $20^a$ or $20^b$, secured to a pusher-bar 27 or 28. As shown in Figs. 15 and 16, there is beneath each rack $C'$ and $C^2$ a plate 29, the forward end of which is beveled to form an incline $v'$ from the upper edge of the plate to the level of the top of the pusher-bar 27 or 28, and in front of a shoulder $w^3$ of the pusher is an incline 31. As a result of this construction the lower stencil of the mass of stencils in each rack lies upon the surface of the plate 29 with sufficient space beneath the face of each lower stencil and above the inclined plane $v'$ to permit the end of the approaching stencil to pass below the lower stencil and up the incline $v'$ and then toward the top of the plate 29, lifting the mass of stencils above, and as the pusher-bar passes inward the projection 31 lifts the adjacent end of the stencil, so as to insure its taking a position parallel to the face of plate 29. All of the stencils which should be discarded must be thrown back by one division of the sorting device, so as to go into one of the racks—say, rack $C^2$—while the others or active stencils should go into the rack $C'$. The various devices are so arranged that normally the stencils will be thrown into a position to go to the rack $C'$ by the rocking of the shaft 23 or the swinging of its arms 25 and when stencils are thrown to the other side and deposited in the rack $C^2$ by the action of the shaft 24 or its arms. As the stencils are reversed when thrown to either side, they will be deposited in the racks in the proper position to be taken therefrom when again used.

The sorter coacting with the stencils having bearing-points, as described, is the means of mechanically directing the stencils to their proper racks.

Assuming that the apparatus is to be used with addressing-stencils for a monthly periodical, the controller must be susceptible of twelve different positions, and this is secured by providing the arm 22, which is expanded at the end to form a plate, with openings $z$, in which is adapted to be secured a controlling-pin E. If the publication is a weekly one, there are fifty-two openings in the arm, as shown in dotted lines. The arm 22 is carried by the frame G, hereinafter described, and moves up and down, carrying the pin E with it. As shown in Fig. 11, each opening $z$ is threaded to receive the threaded end of a box 33, containing a spring 34, which bears on a shoulder 35 of the pin E, which extends through the lower end of the box. Each stencil X has a surface of such dimensions that there may be a bearing in any one of twelve positions corresponding to the positions of the openings $z$. According to the number of times that the stencil is to be used the openings $z$ are placed farther from the initial position on the plate. If, for instance, the stencil must be used nine times, (on a subscription for nine months,) the opening $y$, Fig. 22, is in the ninth position from the starting-point. This stencil, therefore, will nine times pass the controlling-pin E, as the latter is successively set forward during nine months, and will pass into the rack C' eight times, inasmuch as the said controlling-pin will for eight times make contact, as it is carried downward, with the surface of the stencil; but on the ninth movement the controlling-pin will pass through the opening $y$ and will make contact with suitable controlling devices which bring into operation the rock-shaft 24, as the stencil thereafter passes above the arms 26, so that then said stencil will be conducted to the rack $C^2$. The controlling devices coöperating with the pin E may be of different kinds. As shown in Figs. 11 to 13, they consist of a plate 52 upon an arm 36, extending from a rock-shaft 37, the arm 36 being normally lifted by the spring 38 to keep a position below the path of the stencils. When the pin E passes through an opening $y$, it strikes the plate 52, depresses the latter and the arm 36, and rocks the shaft 37, carrying with it an arm 39 on the shaft. The arm 39 carries a pin $39^a$, which acts upon a spring-pawl 40 to carry the latter from the shoulder $t$ of a shifter-bar 41, which is then thrown in the direction of its arrow by means of a spring 42. The shifter-bar controls the position of a T-headed pawl 43, carried by a vertically-reciprocating slide 44 and engaging in one position or the other lugs 45 or 46 of two rack-bars 47 48, the teeth of which engage pinions 49 50 on the rock-shafts 23 24. A spring 59 tends to carry the pawl 43 to the right, so that it may then engage the lug 46 and lift the bar 48. A lug 63 projects from the lower edge of the shifter-bar and carries a roll at the back, and at the front of the slide 44 is an inclined rib $44^a$. A switch-bar 55 is pivoted by a pin 54 below a plate 53 and is held normally in a central position by springs $56^a$ $56^b$, acting on push-rods 56 56, which bear on the opposite sides of a pin 57, projecting from the switch through a slot in the plate 53. At the back of the switch is a rib $55^a$. There is a lug $43^a$ on the pawl, which engages the rib $55^a$. When the arm 39 is depressed by the sorter-pin E striking the plate 52, the pawl 40 is released and the spring 42 shifts the bar 41 to the left, and the downwardly-projecting lug 63 on the shifter-bar 41 by contact with the projection $43^a$ on the front of pawl 43, Fig. 14, causes the pawl to swing over to the left, the length of the roller-lug 63 being sufficient to hold the pawl 43 in its left-hand position until the pawl has descended sufficiently so that its lug $43^a$ is at the left of the rib $55^a$ on the swinging switch-bar 55. During the completion of the downward motion of the pawl 43 the force of the spring 59 is overcome by the stronger spring $56^a$ and the pawl is carried down until its left-hand projection strikes the incline 45. This compresses the spring $56^a$ and allows the pawl to move to the right until it can snap back under the projection 45. Then on its next upward movement it operates the rack-bar 47, revolving the rocker-shaft 24. Just before the completion of the aforesaid downward motion the inclined rib $44^a$ contacts with the roll on the back of lug 63. This causes the bar 41 to return to its original right-hand position, where it is again locked by the spring-pawl 40. When the slide-bar 47 rises to revolve the rocker-shaft 24, the pawl 43 is free at the upper end of its stroke to be again moved to the right by the spring 59, and it will descend at the right of the rib $55^a$ unless it should happen that the next stencil is also to be thrown out, in which case the lug 63 will be in its left-hand position and cause the pawl 43 to remain at the left. In some instances, as when the stencils are heavy, it is desirable to insure their retention by the carrying-arms 25 26 and to hold the stencils so that they cannot be readily moved, except longitudinally, on the table. To this end I provide the carrying-arms with suitable grippers and also arrange grippers adjacent to the guides 16 and 17. As shown in Figs. 20 and 21, each carrying-arm has a pair of L-shaped levers 120, the rounded ends of the vertical arms projecting upward on opposite sides of the path of the stencils to receive the latter as they are pushed longitudinally between them, and on the lower horizontal arms bear the ends of a spring 121, which holds the grippers in frictional contact with the edges of the stencil, but will not prevent the latter from being drawn out when sufficient force is applied. At each side of the table are two pairs of grippers or detents 103, each a spring-actuated vertical dog pivoted at the lower end, pressed in by a spring, and with a shoulder $n$, which engages the top of the stencil when the latter is carried downward between the dogs by the carrying-arms, said shoulder preventing the stencil from rising, so that the grippers of the carrying-arms must yield to permit said arms to swing back without the stencil.

Any suitable inking devices may be used in connection with the stencils and according to the character of the stencils. As shown, there is a printing-frame G pivoted to the frame of the machine at the point 65 and carrying a four-armed rotating pad-carrier H, each arm of which has an inking-pad 66, to which ink is applied (as the carrier is intermittently rotated) from the ink-well or through the medium of inking-rollers, as shown. The frame G is depressed, with one of the pads in position, as each stencil is brought to a stationary position above a platen J. Each pad 66 is of sufficient size to cover the indicating portion of the stencil, and as it presses thereon prints through the same on a continuous wrapper-strip $q$, which is shown as a strip of paper from a roll Q, suitably supported, the sheet passing over suitable guide-rollers, over the table and the platen, and down between two feed-rolls 70 71. The feed-rolls are driven continuously; but the roll 71 has a depressed portion $r$, so that for a moment, while the printing is taking place, the paper will not be fed. The paper passes over the feed-roll, over a blade 72, the edge of which shears with a reciprocating cutter 73, whereby each printed portion of the strip is sheared from the strip, and thence drops onto a suitable support, as a table 74, Fig. 17, which gradually moves downward as the sheets are successively piled thereon. A spring 75 is arranged to lift the table, and a brake device 76, consisting of a plate pivoted at one end and with a hole for the passage of the rod $75^a$, is controlled by a treadle 77, the plate when horizontal permitting the downward movement of the rod, but when canted binding on the rod and preventing any upward movement thereof. To prevent the adhesion of the thin paper of the stencil to the printing-pad, I make use of one, two, or more wires or rods 78, Fig. 9, across the face of the stencil at points where they would not interfere with the indicating portions, and which, as shown in Fig. 9, are carried by a frame 79, sliding upon four vertical pins 80, around each of which is a spring 81, tending to force the plate downward upon the stencil. To lift the plate 79 as each stencil is moved beneath it, I provide the plate 79 with hooks 82, which engage with similar hooks 83, carried by the printing-frame G, which as it rises lifts the plate 79 with it. In order to facilitate the movement of the stencils, the platen J is pivoted at the point 65 and is depressed except at the moment when the printing takes place, when it is forced toward the printing-pad.

These various operations of the different parts may be effected by means of various devices. As shown, a cam K upon the driving-shaft 90 swings the arm 91, Figs. 1 and 2, which is connected by a rod 92 to a pin upon the cross-head 93, Figs. 5 to 7, which is connected to all of the pusher-bars. A portion of the cam K also operates upon an arm 94, Fig. 2, extending from a rock-shaft 95, and to which is connected an extensible rod 96, attached to the forward end of the printing-frame G to raise and lower it, and from an arm 97, extending rearwardly from the shaft 95, a rod 98 extends to the arm supporting the platen J to raise and lower it. The arm 97 also operates upon a lever 99 on a rock-shaft, from which is actuated the cutter 73. A bell-crank lever 100, pivoted on the shaft 95, is also operated by a part of the cam K and reciprocates a rod 101, thereby rocking a lever 102 upon the shaft of the pad-carrier H, which lever carries a pawl 103, which engages a ratchet 104 on the shaft of the said carrier and rotates the same intermittently. The shaft of the feed-wheel 71 is driven, by means of sprockets and a chain 105, from the shaft 90, and the slide 44 is raised and lowered by the operation of a lever 106, Fig. 1, pivoted to a bracket 107 and having a bearing at the inner end upon the shaft 96, so as to be vibrated thereby.

While I have shown stencils or printing-plates with regulator-bearings resulting from the character of the sheet itself, it will be evident that they may be formed in various different ways, as by projections from the frame, or by cutting away the frame, or, as shown in Fig. 23, by disposing metallic plates 200 in different positions on the printing-plate, so as to contact with a sorter having two electric terminals between which the plate 200 completes a circuit when the parts are in contact. The shifter or distributer devices also may be made in various forms, as switches, for directing the printing-plates, whatever their character, to different positions.

Although I have referred to the printing-plates as "stencils," that being the form shown, they may be of any character, and they will not in all cases be printing-plates, as when library-cards, indicating-tablets, &c., must be sorted and distributed, and in such cases the distribution may be made to any desired number of receptacles.

Although I have shown the printing-head provided with a series of ink-pads, a head having a single pad may be used, or one or more printing-rollers or other inking means may be employed. In some cases the printing devices will not be used or required, the machine serving in such cases to sort without printing.

I do not here claim providing plates with progressive bearings, as this is the subject of a separate application for Letters Patent, Serial No. 643,759.

Without limiting myself to the construction and arrangement of parts shown or to any special character of plates to be sorted, I claim as my invention—

1. An apparatus for sorting address-plates and other articles comprising means for directing said plates to different receptacles, said plates having differently-disposed bearings arranged to determine the number of times the plates shall pass through the machine, a sorter upon the machine, and devices whereby said sorter coacts with all the plates to vary the operations of the directing means, according to the positions of the bearings, substantially as described.

2. An apparatus for sorting address-plates and other articles comprising means for directing said plates to different receptacles, said plates having differently-disposed bearings, and a sorter upon the machine, devices whereby said sorter varies the operations of the directing means, according to the positions of the bearings, and means whereby the relative positions of the plates and sorter may be changed from time to time, substantially as described.

3. In an apparatus for sorting address-plates and other articles, having differently-arranged bearings, the combination of devices for distributing said plates to different receptacles, a sorter upon the machine adjustable progressively to different positions to coact progressively with different bearings, and devices intermediate the sorter and the plate-distributing devices for varying the action of the latter, substantially as described.

4. In an apparatus for sorting address-plates and other articles having bearings, differently and progressively arranged, the combination of plate shifters or distributers for moving different plates in different directions, a sorter progressively adjustable upon a moving part of the machine and adjustable to coact progressively with the bearings, and means controlled by said sorter for throwing the shifters into and out of operation upon the plates, substantially as described.

5. In an addressing-machine, the combination of a receptacle for a series of printing-plates having bearings progressively disposed according to the number of times for which the plate is to be used, means for bringing the plates successively into printing action, plate shifters or distributers for directing the plates in different directions, a sorter carried by a moving part of the machine and progressively adjustable to different positions to coact with the bearings, and means for varying the action of the shifters according to the relative positions of the sorter and bearings, substantially as described.

6. A sorting-machine provided with a receptacle for plates to be sorted, means for feeding the plates successively therefrom, means for shifting the plates to distribute them in different directions and a sorting device constructed to coact with differently-disposed bearings of the plates to bring into action the shifting means, substantially as set forth.

7. A sorting-machine provided with a receptacle for plates to be sorted, means for feeding the plates successively therefrom, means for shifting the plates to distribute them in different directions and to reverse them in so doing, a sorting device constructed to coact with differently-disposed bearings of the plates to bring into action the shifting means, and receptacles to which the sorted plates are directed, substantially as set forth.

8. The combination in a sorting and printing machine, of a receptacle for printing-plates, printing means, devices for feeding the plates successively from the receptacle to the printing means, shifting means for directing the plates in different directions from the printing means, and sorting devices coacting with the plates to vary the action of the sorting devices, substantially as set forth.

9. The combination with means for feeding onward a succession of plates having bearings differently disposed, to regulate the number of times each plate shall pass through the machine, a means for shifting the plates in different directions, and a sorting device constructed to coact with all the plates to control the action of the shifting means, substantially as set forth.

10. The combination with means for feeding onward a succession of plates having regulating-bearings differently disposed, of a shifting or distributing device provided with arms arranged to carry the plates in different directions, and a sorting device and connections whereby to bring the different arms into action, substantially as set forth.

11. The shifting or distributing device consisting of rock-shafts provided with arms extending in different directions beneath a path traversed by a succession of plates, a sorting device coacting with the plates, and connections whereby to control the rock-shafts from the sorting device, substantially as set forth.

12. The shifting or distributing device consisting of rock-shafts provided with arms extending in different directions beneath a path traversed by a succession of plates, catches or detents for holding the plates on the arms, a sorting device coacting with the plates, and connections whereby to control the rock-shafts from the sorting device, substantially as set forth.

13. The shifting or distributing device consisting of rock-shafts provided with arms extending in different directions beneath a path traversed by a succession of plates, catches or detents for holding the plates on the arms, a sorting device coacting with the plates, connections whereby to control the rock-shafts from the sorting device, and detents to engage the plates delivered thereto by the arms, substantially as set forth.

14. The combination with means for feeding forward a succession of plates having bearings differently arranged, of a sorter provided with an adjustable pin and support therefor adapted to make contact with said bearings, means for reciprocating said pin and support, and distributing means controlled from said sorter, substantially as set forth.

15. The combination with the shifting or distributing means, of a sorter provided with a reciprocating arm, and a pin adjustable thereon, substantially as set forth.

16. The combination with the shifting or distributing means, of a sorter provided with a reciprocating arm having a series of openings, and a pin adapted to said openings, substantially as set forth.

17. The combination of the table having different channels, means for feeding a succession of plates in said channels, means for conveying the plates from one channel to another, and a sorter and connections for controlling the action of said means, substantially as set forth.

18. The combination of a receptacle for holding a series of plates, means for removing the plates successively from the bottom of said receptacle, other receiving-receptacles, sorting and distributing devices, and means for feeding the sorter-plates successively to the said receiving-receptacles and below the plates therein, substantially as set forth.

19. The receiving-receptacles arranged above feeding-channels for the plates, and provided with plates 29 having inclined forward edges, substantially as set forth.

20. The receiving-receptacles arranged above feeding-channels for the plates, and provided above said channels with plates 29 having inclined forward edges combined with pushers having shoulders for engaging the plates, substantially as set forth.

21. The distributing-receptacle having a base with an opening for the descent of plates therethrough, a channel below said opening, and a downward central projection $w'$ at the end of the opening, combined with a pusher-bar having inclined upper faces and a pusher-shoulder, substantially as set forth.

22. The combination of the plate feeding and shifting devices, a sorter having a reciprocating arm and adjustable pin, a movable contact-plate arranged in position to contact with the said pin, and connections between said plate and the shifting devices, substantially as set forth.

23. The combination with the rock-shafts of the shifting device, of pinions thereon, racks engaging said pinions, a sorter, and connections for controlling the operations of the racks, substantially as set forth.

24. The combination of the rock-shafts, pinions and racks having lugs, a reciprocating pawl, a sorter, and connections whereby the pawl is shifted by the action of said sorter, substantially as set forth.

25. The combination of the rock-shafts, pinions, racks, provided with lugs having inclined upper edges, reciprocating pawl, sorter, and connection for shifting the pawl by the action of said sorter, substantially as set forth.

In testimony whereof I have signed my name to this specification in the presence of two subscribing witnesses.

STERLING ELLIOTT.

Witnesses:
MARGARET R. MAGUIRE,
NIXON WATERMAN.